(12) United States Patent
Jing et al.

(10) Patent No.: US 10,662,291 B2
(45) Date of Patent: May 26, 2020

(54) NANO-SILICA HYBRID VINYL PHENYL SILICON INTERMEDIATE, PREPARATION METHOD THEREOF AND USE THEREOF IN ENVIRONMENTALLY-FRIENDLY INSULATING VARNISH

(71) Applicant: Suzhou Taihu Electric Advanced Material Co, Ltd., Suzhou (CN)

(72) Inventors: Luru Jing, Suzhou (CN); Bin Wu, Suzhou (CN); Chunqi Zhang, Suzhou (CN); Fengxi Jing, Suzhou (CN); Jianfeng Gu, Suzhou (CN); Xiaofeng Xu, Suzhou (CN); Zhifeng Xia, Suzhou (CN)

(*) Notice: Subject to any disclaimer, the term of this patent is extended or adjusted under 35 U.S.C. 154(b) by 71 days.

(21) Appl. No.: 15/992,176

(22) Filed: May 30, 2018

(65) Prior Publication Data

US 2018/0273686 A1 Sep. 27, 2018

Related U.S. Application Data

(63) Continuation of application No. PCT/CN2016/096258, filed on Aug. 22, 2016.

(30) Foreign Application Priority Data

Nov. 30, 2015 (CN) .......................... 2015 1 0853562
Nov. 30, 2015 (CN) .......................... 2015 1 0854357

(51) Int. Cl.
*C08G 77/06* (2006.01)
*C08G 77/20* (2006.01)
*C08G 77/44* (2006.01)
*C09D 183/10* (2006.01)
*C09D 183/04* (2006.01)

(52) U.S. Cl.
CPC ............. *C08G 77/06* (2013.01); *C08G 77/20* (2013.01); *C08G 77/44* (2013.01); *C09D 183/04* (2013.01); *C09D 183/10* (2013.01); *Y02A 50/2327* (2018.01)

(58) Field of Classification Search
CPC ........ C08G 77/38; C08G 77/16; C08G 77/20; C09D 183/04; C08L 83/06; C07F 7/045
See application file for complete search history.

(56) References Cited

U.S. PATENT DOCUMENTS

| 3,642,692 | A | * | 2/1972 | Hrtlage et al. | ........ C08L 83/04 528/34 |
| 4,448,927 | A | | 5/1984 | Falender et al. | |
| 4,923,755 | A | | 5/1990 | Witucki | |
| 6,211,307 | B1 | | 4/2001 | Iwabuchi et al. | |

FOREIGN PATENT DOCUMENTS

| CN | 101457022 A | 6/2009 |
| CN | 105349034 A | 9/2011 |
| CN | 102888001 A | 1/2013 |
| CN | 102898651 A | 1/2013 |
| CN | 105348534 A | 2/2016 |

* cited by examiner

*Primary Examiner* — Kuo Liang Peng
(74) *Attorney, Agent, or Firm* — Erson IP (Nelson IP)

(57) ABSTRACT

A nano-silica hybrid vinyl phenyl silicon intermediate, a preparation method therefor and a use thereof in an environmentally-friendly insulating varnish are provided. The nano-silica particles are dispersed uniformly and stably; the nana-silica hybrid vinyl phenyl silicon intermediate has the advantages of resisting high temperatures and coronas and being high in activity; the temperature index measured according to a secant method is 200° C.-240° C., the measured corona-resistant time is 18-36h, and the vinyl active sites carried thereon can have a good compatibility with polyesterimide, heat-resistant polyesters, hydrogen-containing siloxane and modified epoxy; the intermediate is particularly suitable for preparing a high-temperature-resistant and corona-resistant solvent-free insulating varnish; and there are on volatile gases during use, thereby causing on pollution to the atmospheric environment.

12 Claims, No Drawings

NANO-SILICA HYBRID VINYL PHENYL SILICON INTERMEDIATE, PREPARATION METHOD THEREOF AND USE THEREOF IN ENVIRONMENTALLY-FRIENDLY INSULATING VARNISH

CROSS-REFERENCE TO RELATED APPLICATIONS

This application is a continuation of International Patent Application No. PCT/CN2016/096258 with a filing date of Aug. 22, 2016, designating the United States, and further claims priority to Chinese Patent Application No. CN201510854357.0 with a filing date of Nov. 30, 2015 and No. CN201510853562.5 with a filing date of Nov. 30, 2015. The content of the aforementioned applications, including any intervening amendments thereto, are incorporated herein by reference.

FIELD OF THE INVENTION

The present invention refers to a nano-silica hybrid vinyl phenyl silicon intermediate, a preparation method thereof and a use thereof in environmentally-friendly insulating varnish.

BACKGROUND OF THE INVENTION

In traditional method for preparing nano composite materials, nano particles are mixed into organics physically, or grafted onto organics after being modified and organized on surface, which may lead to the problem of reunion and sedimentation. In recent years, researchers in the world have contributed to improve the dispersion of nano particles, and as a result, a situ polymerization method, which is an advanced and effective preparation method for nano composite materials, has been popular in the public. However, this method is only used to modify the traditional nano composite organic resin (eg. polyester resin, epoxy resin, acrylic resin), but rarely applied on the preparation for the nano silicone resin.

In the synthetic method for vinyl organic/inorganic nano-hybrid material published at Nov. 17, 1999 and numbered CN1235170A, a traditional Sol-Gel method is applied. A Sol-Gel precursor tetraethoxysilane is hydrolyzed to a sol with catalysis of a hydrochloric acid, and a gel is obtained after adding a vinyl monomer into the sol at 30-50° C. Then a situ polymerization takes place at 5-45° C. under y ray radiation of 5-100 KGy for 4-20 h. In the end, the hybrid material is obtained after heating and drying the sample at 60-80° C. under y ray radiation for 1-2 weeks.

In traditional insulating varnish made of silicone resin, a solvent based silicone resin is used. It's unavoidable to produce pollution to the environment because of the volatile gas in production. and the energy consumption is extremely high since the high-temperature curing is necessary. However, most of the few solvent-free silicone resins have high viscosity and low activity and need to be cured at a high temperature. The mass percent of the reactive diluent added should be more than 30% since the viscosity of the resin is too high, resulting in the volatile matter content exceeding 5%. As a result, the heat resistance and mechanical performances are degraded. In a VPI application, the resin should be heated in use and preserved at a low temperature after use, which not only needs a high-quality device but also is tedious in process. As the fast development of the motor market in the world, the motor manufacture is developed towards high efficiency, energy conservation and miniaturization. The heat-resistant level and energy conservation level of the insulating paint are demanded to be higher as well as the corona-resistant ability, in order to satisfy the demand of the industry. In the prior art, directly mixing with nano particles is always used to enhance the corona-resistant ability, however, the effective is poor because the particles are easy to unite and settle. In general, the silicone based insulating varnish in the prior art don't satisfy the demand of energy conservation, emission reduction, environmentally, and economically.

SUMMARY OF THE INVENTION

The technical problem to be solved in the present invention is to provide a nano-silica hybrid vinyl phenyl silicon intermediate, preparation method thereof and use thereof in environmentally-friendly insulating varnish. The nano particles are dispersed uniformly, not together and stably in size, and both the nano-silica hybrid vinyl phenyl silicon intermediate and the environmentally-friendly insulating varnish have good corona-resistant performances.

In order to solve the technical problem, the following technical scheme is provided in the present invention.

In one aspect, a nano-silica hybrid vinyl phenyl silicon intermediate is provided in the present invention, whose structural formula is:

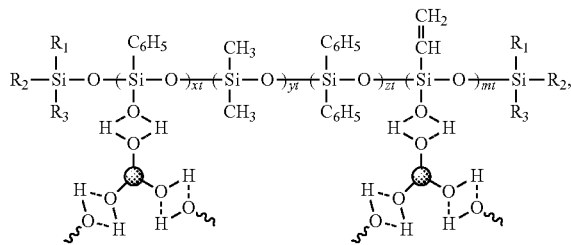

wherein,

represents a nano-silica particle;
" $\sim\!\!\sim\!\!\sim$ " represents

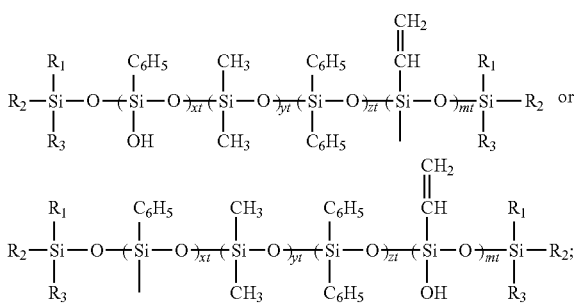

x, y, z, m is respectively a figure between 0 and 20 and none of them equals to 0;

t is a figure between 0.1 and 2.0;

xt represents the product of x and t, yt represents the product of y and t, zt represents the product of z and t, mt represents the product of m and t;

two of $R_1$, $R_2$, $R_3$ are methyl, and the other is vinyl.

In the present invention, x, y, z, m are parameters represent the sizes of the molecular chains of the silicone alcohol in the silicone alcohol solution, and their absolute values represent the average polymerization degree of the macromolecules. The average polymerization degree is determined by the ingredient ratio, the category and amount of the catalyst, the reacting temperature and the reacting period in the polymerization reaction, and it can be calculated according to the GPC molecular weight mensuration in combination with the elemental analysis. In addition, it should be understood by the skills in the art, that although the structural units in the structural formula are connected together in a certain sequence, it's only intended to express the molecular composition of the silicon immediate conveniently, but not representing that the structural units in the silicon intermediate are really connected in such a sequence. In fact, the structural units are connected in an irregular sequence usually.

In the present invention, the values of x, y, z, m are determined by the silicone alcohol solution, and the value of t is determined by the molecular weight regulator. The larger the amount of the molecular weight regulator is, the smaller the value of t will be.

Advantageously, the mass ratio of the nano-silica particle in the nano-silica hybrid vinyl phenyl silicon intermediate is 1%-10%; the total number of moles of the phenyl, the methyl and the vinyl connected to the silicon atom in the nano-silica hybrid vinyl phenyl silicon intermediate is 1.5-1.6, and the ratio of the phenyl to the total number is 35%-45%; and the mass ratio of the vinyl in the nano-silica hybrid vinyl phenyl silicon intermediate is 0.6%-4.1%.

Advantageously, the temperature index of the nano-silica hybrid vinyl phenyl silicon intermediate is measured as 200° C.-240° C. according to a secant method; the corona-resistant time of the nano-silica hybrid vinyl phenyl silicon intermediate in a normal state is measured as 18-36 h when the atmospheric humidity is 30%-85% and a power frequency voltage as 2 kv is applied, and the molecular mass of the nano-silica hybrid vinyl phenyl silicon intermediate is measured as 2000-3000 according to the GPC method.

The test specimens for the said temperature index and corona-resistant performance of the nano-silica hybrid vinyl phenyl silicon intermediate are condensates processed at 180° C. for 4 h and at 220° C. for 4 h.

Advantageously, the nano-silica hybrid vinyl phenyl silicon intermediate is prepared from a polymerization reaction of the following recipe, and the recipe by weight comprises:

| | |
|---|---:|
| A silicone alcohol solution | 100 shares |
| An ethyl silicate | 9-25 shares |
| A catalyst | 0.06-0.6 shares |
| A molecular weight regulator | 4-6 shares |
| An Organic solvent | 10-20 shares |
| Water | 1-6 shares |

Wherein, the silicone alcohol solution comprises one or a combination of TH-1#, TH-2# and TH-3#.

In the present invention, TH-1#, TH-2# and TH-3# are bought from Suzhou Taihu Electric Advanced Material Co. LTD.

In the present invention, the solid content of TH-1#, TH-2#, TH-3# is 60%, which is made of any three of a phenyl trichlorosilane, a dimethyl dichlorosilane, a diphenyl dichlorosilane, and a vinyl trichlorosilane with different ratios by hydrolysis. The technical parameters are as follows, R/Si=1.5~1.6, Ph/R=0.35~0.45, and the ratio of the vinyl is 0.6%~4.0%.

More advantageously, the organic solvent comprises one or a combination of a N,N-dimethylformamide, a methylbenzene and a dimethylbenzene; the catalyst comprises one or a combination of an aqueous solution of trifluoroacetic acid with a mass percent of 5%-15%, an aqueous solution of trifluoropropionic acid with a mass percent of 5%-15%, and an aqueous solution of hydrochloric acid with a mass percent of 5%-15%; the molecular weight regulator is a tetramethyl diethylene disiloxane.

In another aspect, a preparation method for the nano-silica hybrid vinyl phenyl silicon intermediate is provided in the present invention, which comprises following steps:

step I: stirring the silicone alcohol solution and the ethyl silicate for 0.1-1 h at 20° C.-35° C. under the protection of nitrogen and in the presence of the organic solvent, and then heating up to 60±5° C.;

step II: adding the catalyst, the molecular weight regulator, and the water into the reacting system of step I and heating up to 60° C.-80° C. to keep the reflux reaction for 2-4 h, and then the nano-silica hybrid vinyl phenyl silicon intermediate is obtained after decompression and distillation.

Advantageously, the detailed implementing method of step I comprises: adding the silicone alcohol solution to a reactor with a stirring thermostat, and inletting the nitrogen to remove the air in the reactor, and stirring for 0.1-1 h at 20° C.-35° C. after adding the ethyl silicate and the organic solvent into the reactor, and then heating up to 60±5° C.

Advantageously, the detailed implementing method of step II comprises: mixing the catalyst, the molecular weight regulator, and the water thoroughly, dripping the mixture into the reacting system of step I within 1 h, and heating up to 60° C.-80° C. under stirring to keep the reflux reaction for 2-4 h, and then the thick and solid nano-silica hybrid vinyl phenyl silicon intermediate is obtained after removing the $H_2O$, the ethyl alcohol and the organic solvent produced in the polymerization reaction by decompression and distillation at 80° C.-120° C., and at −0.085 MPa~−0.098 MPa.

In a third aspect, a use of the nano-silica hybrid vinyl phenyl silicon intermediate in preparing a solvent-free pouring sealant, a adhesive, a insulating resin or a environmentally-friendly insulating varnish is provided in the present invention.

In a fourth aspect, a low-viscosity, high-temperature-resistant and corona-resistant environmentally-friendly insulating varnish is provided in the present invention, which comprises by weight:

A nano-silica hybrid vinyl phenyl silicon intermediate 100 shares

| | |
|---|---:|
| An organic resin | 5-50 shares |
| A tetraisopropyl titanate | 0.5-1.5 shares |
| Vinyl initiator | 1-5 shares |
| A promoter | 0.1-2 shares |
| A storage stabilizer | 0.01-0.1 shares |

Wherein, the structural formula of the nano-silica hybrid vinyl phenyl silicon intermediate is:

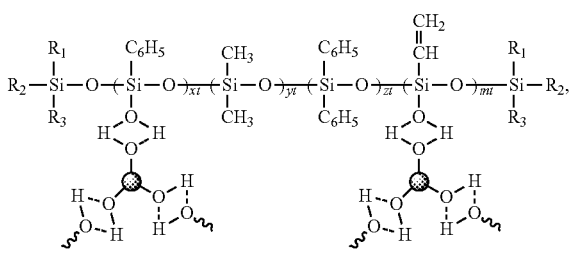

wherein,

represents a nano-silica particle;
" ᴡᴡᴡ " represents

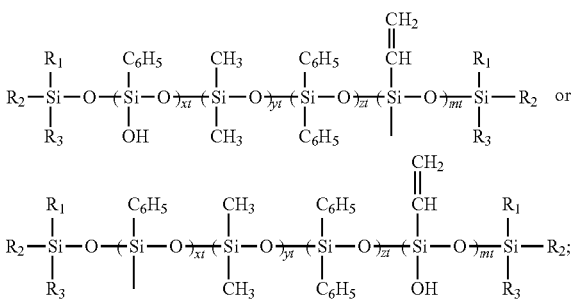

x, y, z, m is respectively a figure between 0 and 20 and none of them equals to 0;

t is a figure between 0.1 and 2.0;

xt represents the product of x and t, yt represents the product of y and t, zt represents the product of z and t, mt represents the product of m and t;

two of $R_1$, $R_2$, $R_3$ are methyl, and the other is vinyl.

In the present invention, x, y, z, m are parameters represent the sizes of the molecular chains of the silicone alcohol in the silicone alcohol solution, and their absolute values represent the average polymerization degree of the macromolecules. The average polymerization degree is determined by the ingredient ratio, the category and amount of the catalyst, the reacting temperature and the reacting period in the polymerization reaction, and it can be calculated according to the GPC molecular weight mensuration in combination with the elemental analysis. In addition, it should be understood by the skills in the art, that although the structural units in the structural formula are connected together in a certain sequence, it's only intended to express the molecular composition of the silicon immediate conveniently, but not representing that the structural units in the silicon intermediate are really connected in such a sequence. In fact, the structural units are connected in an irregular sequence usually.

In the present invention, the values of x, y, z, m are determined by the silicone alcohol solution, and the value of t is determined by the molecular weight regulator. The larger the amount of the molecular weight regulator is, the smaller the value of t will be.

Advantageously, the mass ratio of the nano-silica particle in the nano-silica hybrid vinyl phenyl silicon intermediate is 1%-10%; the total number of moles of the phenyl, the methyl and the vinyl connected to the silicon atom in the nano-silica hybrid vinyl phenyl silicon intermediate is 1.5-1.6, and the ratio of the phenyl to the total number is 35%-45%; and the mass ratio of the vinyl in the nano-silica hybrid vinyl phenyl silicon intermediate is 0.6%-4.1%.

Advantageously, the temperature index of the nano-silica hybrid vinyl phenyl silicon intermediate is measured as 200° C.-240° C. according to a secant method; the corona-resistant time of the nano-silica hybrid vinyl phenyl silicon intermediate in a normal state is measured as 18-36 h when the atmospheric humidity is 30%-85% and a power frequency voltage as 2 kv is applied, and the molecular mass of the nano-silica hybrid vinyl phenyl silicon intermediate is measured as 2000-3000 according to the GPC method.

The test specimens for the said temperature index and corona-resistant performance of the nano-silica hybrid vinyl phenyl silicon intermediate are condensates processed at 180° C. for 4 h and at 220° C. for 4 h.

Advantageously, the nano-silica hybrid vinyl phenyl silicon intermediate is prepared from a polymerization reaction of the following recipe, and the recipe by weight comprises:

| | |
|---|---|
| A silicone alcohol solution | 100 shares |
| An ethyl silicate | 9-25 shares |
| A catalyst | 0.06-0.6 shares |
| A molecular weight regulator | 4-6 shares |
| An Organic solvent | 10-20 shares |
| Water | 1-6 shares |

Wherein, the silicone alcohol solution comprises one or a combination of TH-1#, TH-2# and TH-3#.

In the present invention, TH-1#, TH-2# and TH-3# are bought from Suzhou Taihu Electric Advanced Material Co. LTD.

In the present invention, the solid content of TH-1#, TH-2#, TH-3# is 60%, which is made of any three of a phenyl trichlorosilane, a dimethyl dichlorosilane, a diphenyl dichlorosilane, and a vinyl trichlorosilane with different ratios by hydrolysis. The technical parameters are as follows, R/Si=1.5~1.6, Ph/R=0.35~0.45, and the ratio of the vinyl is 0.6%~4.0%.

More advantageously, the preparation method for the nano-silica hybrid vinyl phenyl silicon intermediate comprises following steps:

step I: stirring the silicone alcohol solution and the ethyl silicate for 0.1-1 h at 20° C.-35° C. under the protection of nitrogen and in the presence of the organic solvent, and then heating up to 60±5° C.;

step II: adding the catalyst, the molecular weight regulator, and the water into the reacting system of step I and heating up to 60° C.-80° C. to keep the reflux reaction for 2-4 h, and then the nano-silica hybrid vinyl phenyl silicon intermediate is obtained after decompression and distillation.

More advantageously, the detailed implementing method of step I comprises: adding the silicone alcohol solution to a reactor with a stirring thermostat, and inletting the nitrogen to remove the air in the reactor, and stirring for 0.1-1 h at 20° C.-35° C. after adding the ethyl silicate and the organic solvent into the reactor, and then heating up to 60±5° C.

More advantageously, the detailed implementing method of step II comprises: mixing the catalyst, the molecular weight regulator, and the water thoroughly, dripping the mixture into the reacting system of step I within 1 h, and heating up to 60° C.-80° C. under stirring to keep the reflux reaction for 2-4 h, and then the thick and solid nano-silica hybrid vinyl phenyl silicon intermediate is obtained after removing the H₂O, the ethyl alcohol and the organic solvent produced in the polymerization reaction by decompression and distillation at 80° C.-120° C., and at −0.085 MPa~−0.098 MPa.

More advantageously, the organic solvent comprises one or a combination of a N,N-dimethylformamide, a methylbenzene and a dimethylbenzene; the catalyst comprises one or a combination of an aqueous solution of trifluoroacetic acid with a mass percent of 5%-15%, an aqueous solution of trifluoropropionic acid with a mass percent of 5%-15%, and an aqueous solution of hydrochloric acid with a mass percent of 5%-15%; the molecular weight regulator is a tetramethyl diethylene disiloxane, and the ethyl silicate is the ethyl silicate 28.

Advantageously, the organic resin comprises one or a mixture of a E51 epoxy resin, a F51 epoxy resin or a HR199 unsaturated polyester resin; the vinyl initiator comprises one or a mixture of a dicumyl peroxide, a dibenzoyl peroxide, or an isopropyl benzene hydroperoxide; the promoter is a titanium oxide acetylacetonate; the storage stabilizer comprises one or a mixture of a hydroquinone, a hydroquinone monomethyl ether, or a 2,5-tert-butyl hydroquinone.

More advantageously, the epoxy values of the E51 epoxy resin and the F51 epoxy resin are both 0.49-0.53; the average molecular weight of the HR199 unsaturated polyester resin is 400-1000.

Advantageously, the low-viscosity, high-temperature-resistant and corona-resistant environmentally-friendly insulating varnish further comprises 5-20 shares of reactive diluent; the reactive diluent comprises one or a mixture of a tripropylene glycol diacrylate (TPGDA), a trimethylolpropane triacrylate (TMPTA), or a tri(epoxy propyl) isocyanurate triacrylate.

Advantageously, the low-viscosity, high-temperature-resistant and corona-resistant environmentally-friendly insulating varnish further comprises 0.01-8 shares of an epoxy latent curing agent; the epoxy latent curing agent comprises one or a mixture of a zinc 2-ethylhexanoate, a methacrylate modified 2-isopropyl imidazole, or a catechol dimethyl ethanolamine borate.

In a fifth aspect, a preparation method for the low-viscosity, high-temperature-resistant and corona-resistant environmentally-friendly insulating varnish is provided in the present invention, which comprises following steps:

Step I: mixing the nano-silica hybrid vinyl phenyl silicon intermediate and the organic resin according to the amount in the recipe and heating them to 110° C.-130° C., and then depressing and distilling the reacting system for 20-40 min to remove the few water in the system;

Step II: adding the tetraisopropyl titanate into the system of step I and heating the system to 160° C.-180° C. to keep the stirring reaction for 2-4 h, and then cooling the system to 70° C.-90° C.;

Step III: adding the storage stabilizer, the vinyl initiator and the promoter into the system of II according to the amount in the recipe, and adding the reactive diluent and the epoxy latent curing agent selectively, thus the low-viscosity, high-temperature-resistant and corona-resistant environmentally-friendly insulating varnish is obtained after mixing them thoroughly.

Following advantages can be achieved by implementing the present invention compared with the prior art.

In the nano-silica hybrid vinyl phenyl silicon intermediate in the present invention, the nano-silica particles are dispersed uniformly and stably; the nana-silica hybrid vinyl phenyl silicon intermediate has the advantages of resisting high temperatures and coronas and being high in activity; the temperature index measured according to a secant method is 200° C.-240° C., the measured corona-resistant time is 18-36 h (test conditions: normality (25° C.), atmospheric humidity 30-85%, applied power frequency voltage: 2 kV until breakdown), and the vinyl active sites carried thereon can have a good compatibility with polyesterimide, heat-resistant polyesters, hydrogen-containing siloxane and modified epoxy; the intermediate has better corona-resistance and mechanical properties than common physically hybrid nano composite resin, and it is particularly suitable for preparing a high-temperature-resistant and corona-resistant solvent-free insulating varnish; and there are no volatile gases during use, thereby causing on pollution to the atmospheric environment.

The method for preparing the nano-silica hybrid vinyl phenyl silicon intermediate is simple, the reaction temperature is low, and the viscosity of the product and the content of the nano-silica can be controlled by controlling the amounts of a catalyst and a molecular weight modifier and the reaction temperature, thereby enabling the applicability of the product to be wider. Especially, the environmentally-friendly insulating varnish made of the intermediate has good performances of high-temperature resistance and corona resistance as well as a low heat medium loss.

The nano-silica hybrid vinyl phenyl silicon intermediate is prepared according to the in-situ polymerization in the present invention, which overcomes the disadvantages of easy-reunion and easy-sedimentation. The insulating paint made of the intermediate hasn't benzene solvent, thereby preventing the poison to humans and the pollution to the environment resulted from the volatilization of the benzene diluents. It is economical, practical and environmental to use environmentally-friendly solvents without neutralization and wash. The nano particles in the product are small, uniform and well distributed in the resin without reunion and sedimentation, and the viscosity of the product can be controlled, which overcomes the conflict between viscosity and performance. The insulating paint in the present invention is environmentally-friendly, low-temperature-curing, high-temperature resistant (≥200° C.), corona resistant, and has a small dielectric loss, a good storage stability, a strong mechanical strength, a good overall performance, a fast drying speed and a low viscosity. The preparation methods for all these insulating varnishes are simple, cheap and suitable for scale production.

DETAILED DESCRIPTION OF THE EMBODIMENTS

In order to explain briefly, in following embodiments, R/Si is used to represent the total number of groups (moles) of the methyl, the phenyl and the vinyl connected to the silicon atom in the silicon intermediate; Ph/R is used to represent the ratio (mole ratio) of the phenyl to all groups (the methyl, the phenyl and the vinyl); Vi mass percent % is used to represent the ratio (mass percent) of the vinyl to the silicon intermediate. In addition, the molecular weight of the vinyl silicon intermediate is measured according to the gel permeation chromatography (GPC) method. The performance test for the insulating paint is operated according to the GB/T15022-1994 *The definition and general requirements of an electrical-insulating solvent-free polymeric resin complex*, the GB/T15023-1994 *A test method for electrical-insulating solvent-free polymeric resin complex*, and the GB/T11027-1999 *Specification for solvent insulat-* ing varnish, Specifications for individual materials, Standard for hot-cure impregnating varnish.

The present invention will be further explained in combination with the following embodiments which are not limitations to the present invention. The following ingredients can be bought on market. And the shares in the recipe are referred to weight shares unless otherwise specified.

The First Embodiment

The amount of the ingredients in the first embodiment is referred to the Table 1.

A nano-silica hybrid vinyl phenyl silicon intermediate is prepared by following steps:

step I: adding the silicone alcohol solution to a reactor with a stirring thermostat, and inletting the nitrogen to remove the air in the reactor, and stirring for 0.5 h at 20° C. after adding the ethyl silicate 28 (TEOS-28) and the organic solvent into the reactor, and then heating up to 60±5° C.;

step II: mixing the catalyst, the molecular weight regulator, and the deionized water thoroughly, dripping the mixture into the reacting system of step I within 1 h, and heating up to 60° C.-80° C. under stirring to keep the reflux reaction for 3 h, and then the thick and solid nano-silica hybrid vinyl phenyl silicon intermediate is obtained after removing the $H_2O$, the ethyl alcohol and the organic solvent produced in the polymerization reaction by decompression and distillation at 80° C., and at −0.085 MPa.

The main performances and structural parameters of the nano-silica hybrid vinyl phenyl silicon intermediate is referred to the Table 1.

The Second Embodiment

The amount of the ingredients in the second embodiment is referred to Table 1.

A nano-silica hybrid vinyl phenyl silicon intermediate is prepared by following steps:

step I: adding the silicone alcohol solution to a reactor with a stirring thermostat, and inletting the nitrogen to remove the air in the reactor, and stirring for 0.5 h at 30° C. after adding the ethyl silicate 28 (TEOS-28) and the organic solvent into the reactor, and then heating up to 60±5° C.;

step II: mixing the catalyst, the molecular weight regulator, and the deionized water thoroughly, dripping the mixture into the reacting system of step I within 1 h, and heating up to 60° C.-80° C. under stirring to keep the reflux reaction for 2 h, and then the thick and solid nano-silica hybrid vinyl phenyl silicon intermediate is obtained after removing the $H_2O$, the ethyl alcohol and the organic solvent produced in the polymerization reaction by decompression and distillation at 100° C., and at −0.095 MPa.

The main performances and structural parameters of the nano-silica hybrid vinyl phenyl silicon intermediate is referred to the Table 1.

The Third Embodiment

The amount of the ingredients in the third embodiment is referred to the Table 1.

A nano-silica hybrid vinyl phenyl silicon intermediate is prepared by following steps:

step I: adding the silicone alcohol solution to a reactor with a stirring thermostat, and inletting the nitrogen to remove the air in the reactor, and stirring for 0.5 h at 35° C. after adding the ethyl silicate 28 (TEOS-28) and the organic solvent into the reactor, and then heating up to 60±5° C.;

step II: mixing the catalyst, the molecular weight regulator, and the deionized water thoroughly, dripping the mixture into the reacting system of step I within 1 h, and heating up to 60° C.-80° C. under stirring to keep the reflux reaction for 2 h, and then the thick and solid nano-silica hybrid vinyl phenyl silicon intermediate is obtained after removing the $H_2O$, the ethyl alcohol and the organic solvent produced in the polymerization reaction by decompression and distillation at 100° C., and at −0.095 MPa.

The main performances and structural parameters of the nano-silica hybrid vinyl phenyl silicon intermediate is referred to the Table 1.

The Fourth Embodiment

The amount of the ingredients in the fourth embodiment is referred to the Table 1.

A nano-silica hybrid vinyl phenyl silicon intermediate is prepared by following steps:

step I: adding the silicone alcohol solution to a reactor with a stirring thermostat, and inletting the nitrogen to remove the air in the reactor, and stirring for 0.5 h at 35° C. after adding the ethyl silicate 28 (TEOS-28) and the organic solvent into the reactor, and then heating up to 60±5° C.;

step II: mixing the catalyst, the molecular weight regulator, and the deionized water thoroughly, dripping the mixture into the reacting system of step I within 1 h, and heating up to 60° C.-80° C. under stirring to keep the reflux reaction for 4 h, and then the thick and solid nano-silica hybrid vinyl phenyl silicon intermediate is obtained after removing the $H_2O$, the ethyl alcohol and the organic solvent produced in the polymerization reaction by decompression and distillation at 100° C., and at −0.095 MPa.

The main performances and structural parameters of the nano-silica hybrid vinyl phenyl silicon intermediate is referred to the Table 1.

The Fifth Embodiment

The amount of the ingredients in the fifth embodiment is referred to the Table 1.

A nano-silica hybrid vinyl phenyl silicon intermediate is prepared by following steps:

step I: adding the silicone alcohol solution to a reactor with a stirring thermostat, and inletting the nitrogen to remove the air in the reactor, and stirring for 1 h at 25° C. after adding the ethyl silicate 28 (TEOS-28) and the organic solvent into the reactor, and then heating up to 60±5° C.;

step II: mixing the catalyst, the molecular weight regulator, and the deionized water thoroughly, dripping the mixture into the reacting system of step I within 1 h, and heating up to 60° C.-80° C. under stirring to keep the reflux reaction for 4 h, and then the thick and solid nano-silica hybrid vinyl phenyl silicon intermediate is obtained after removing the $H_2O$, the ethyl alcohol and the organic solvent produced in the polymerization reaction by decompression and distillation at 120° C., and at −0.098 MPa.

The main performances and structural parameters of the nano-silica hybrid vinyl phenyl silicon intermediate is referred to the Table 1.

The Sixth Embodiment

The amount of the ingredients in the sixth embodiment is referred to the Table 1.

A nano-silica hybrid vinyl phenyl silicon intermediate is prepared by following steps:

step I: adding the silicone alcohol solution to a reactor with a stirring thermostat, and inletting the nitrogen to remove the air in the reactor, and stirring for 1 h at 28° C. after adding the ethyl silicate 28 (TEOS-28) and the organic solvent into the reactor, and then heating up to 60±5° C.;

step II: mixing the catalyst, the molecular weight regulator, and the deionized water thoroughly, dripping the mixture into the reacting system of step I within 1 h, and heating up to 60° C.-80° C. under stirring to keep the reflux reaction for 2 h, and then the thick and solid nano-silica hybrid vinyl phenyl silicon intermediate is obtained after removing the $H_2O$, the ethyl alcohol and the organic solvent produced in the polymerization reaction by decompression and distillation at 110° C., and at −0.090 MPa.

The main performances and structural parameters of the nano-silica hybrid vinyl phenyl silicon intermediate is referred to the Table 1.

The First Contrastive Example

The amount of the ingredients in the first contrastive example is referred to the Table 1.

A nano-silica hybrid vinyl phenyl silicon intermediate is prepared by following steps:

step I: adding the silicone alcohol solution to a reactor with a stirring thermostat, and inletting the nitrogen to remove the air in the reactor, and stirring for 2 h at 40° C. after adding the nano-silica and the organic solvent into the reactor;

step II: mixing the catalyst and the molecular weight regulator thoroughly, dripping the mixture into the reacting system of step I within 1 h, and heating up to 90° C. under stirring to keep the reflux reaction for 5 h, and then the thick and solid nano-silica hybrid vinyl phenyl silicon intermediate is obtained after removing the $H_2O$, the ethyl alcohol and the organic solvent produced in the polymerization reaction by decompression and distillation at 70° C., and at −0.095 MPa.

The main performances and structural parameters of the nano-silica hybrid vinyl phenyl silicon intermediate is referred to the Table 1.

The Second Contrastive Example

The amount of the ingredients in the second contrastive example is referred to the Table 1.

A nano-silica hybrid vinyl phenyl silicon intermediate is prepared by following steps:

step I: adding the silicone alcohol solution to a reactor with a stirring thermostat, and inletting the nitrogen to remove the air in the reactor, and stirring for 2 h at 15° C. after adding the nano-silica and the organic solvent into the reactor;

step II: mixing the catalyst and the molecular weight regulator thoroughly, dripping the mixture into the reacting system of step I within 1 h, and heating up to 60° C. under stirring to keep the reflux reaction for 2 h, and then the thick and solid nano-silica hybrid vinyl phenyl silicon intermediate is obtained after removing the $H_2O$, the ethyl alcohol and the organic solvent produced in the polymerization reaction by decompression and distillation at 130° C., and at −0.095 MPa.

The main performances and structural parameters of the nano-silica hybrid vinyl phenyl silicon intermediate is referred to the Table 1.

The Third Contrastive Example

The amount of the ingredients in the third contrastive example is referred to the Table 1.

A nano-silica hybrid vinyl phenyl silicon intermediate is prepared by following steps:

step I: adding the silicone alcohol solution to a reactor with a stirring thermostat, and inletting the nitrogen to remove the air in the reactor, and stirring for 1 h at 30° C. after adding the nano-silica and the organic solvent into the reactor;

step II: mixing the catalyst and the molecular weight regulator thoroughly, dripping the mixture into the reacting system of step I within 1 h, and heating up to 50° C. under stirring to keep the reflux reaction for 2 h, and then the thick and solid nano-silica hybrid vinyl phenyl silicon intermediate is obtained after removing the $H_2O$, the ethyl alcohol and the organic solvent produced in the polymerization reaction by decompression and distillation at 130° C., and at −0.095 MPa.

The main performances and structural parameters of the nano-silica hybrid vinyl phenyl silicon intermediate is referred to the Table 1.

TABLE 1

|  | First embodiment | Second embodiment | Third embodiment | Fourth embodiment | Fifth embodiment | Sixth embodiment | First contrastive example | Second contrastive example | Third contrastive example |
|---|---|---|---|---|---|---|---|---|---|
| Recipe | | | | | | | | | |
| Silicone alcohol solution | TH-1# | TH-2# | TH-3# | TH-1#/2#/3# | TH-1#/2# | TH-1#/3# | TH-1# | TH-2# | TH-3# |
|  | 100 | 100 | 100 | 100 | 100 | 100 | 100 | 100 | 100 |
| TEOS | 18 | 21 | 24 | 24 | 24 | 24 |  |  |  |
| Nano-SiO$_2$ |  |  |  |  |  |  | 3.6 | 4.2 | 4.8 |
| Amount of solvents | C | B | C + B | A | C | C + B | C | B | C + B |
|  | 15 | 10 | 15 | 20 | 15 | 15 | 15 | 10 | 15 |
| Catalyst | A | A + B | B | C | A + B | B | A | A + B | B |
|  | 0.08 | 0.1 | 0.2 | 0.6 | 0.12 | 0.25 | 0.08 | 0.1 | 0.2 |
| Distilled water | 3.6 | 4.8 | 6 | 6 | 6 | 6 |  |  |  |
| Molecular weight regulator | 5 | 6 | 5 | 4 | 6 | 5 | 5 | 6 | 5 |
| The chemical structural parameters of the nano-silica hybrid vinyl phenyl silicon intermediate | | | | | | | | | |
| x | 6.0 | 11.5 | 7.0 | 8.04 | 8.73 | 6.51 | 6.01 | 11.44 | 7.01 |
| y | 6.0 | 14.5 | 8.0 | 9.09 | 10.1 | 9.76 | 5.87 | 14.32 | 7.58 |

TABLE 1-continued

|  | First embodiment | Second embodiment | Third embodiment | Fourth embodiment | Fifth embodiment | Sixth embodiment | First contrastive example | Second contrastive example | Third contrastive example |
|---|---|---|---|---|---|---|---|---|---|
| z | 2.0 | 2.3 | 1.0 | 1.7 | 2.13 | 1.81 | 2.04 | 2.21 | 1.06 |
| m | 2.0 | 0.5 | 1.6 | 1.38 | 1.21 | 1.27 | 1.9 | 0.52 | 1.63 |
| t | 1.27 | 0.62 | 1.24 | 1.29 | 0.78 | 1.1 | 1.27 | 0.62 | 1.24 |
| R/Si | 1.5 | 1.6 | 1.5 | 1.52 | 1.54 | 1.53 | 1.5 | 1.58 | 1.5 |
| Ph/R | 0.43 | 0.35 | 0.35 | 0.37 | 0.39 | 0.37 | 0.43 | 0.35 | 0.35 |
| Vi mass percent % | 4.1 | 0.6 | 3.2 | 2.69 | 2.35 | 2.43 | 4.1 | 0.6 | 3.2 |
| The performance indicator of the nano-silica hybrid vinyl phenyl silicon intermediate | | | | | | | | | |
| Appearance/25° C. | | | | Sticky and colloidal solid | | | | | |
| volatile shares % | ≤0.5 | ≤0.5 | ≤0.5 | ≤0.5 | ≤0.5 | ≤0.5 | ≤0.5 | ≤0.5 | ≤0.5 |
| Temperature index ° C. | 238 | 229 | 228 | 231 | 233 | 229 | 223 | 217 | 218 |
| corona-resistant time (h) | 18 | 24 | 32 | 31 | 32 | 30 | 8 | 7 | 8 |
| GPC molecular weight | 2426 | 2055 | 2423 | 2966 | 2051 | 2409 | 2396 | 1958 | 2208 |
| Catalyst | A | 10% trifluoroacetic acid | | Solvent | | A | N,N-dimethylformamide | | |
|  | B | 10% trifluoropropionic acid | | | | B | Methylbenzene | | |
|  | C | 10% hydrochloric acid | | | | C | Dimethylbenzene | | |

Note:
The two compositions in the catalyst or solvent mixture in the recipe are equal in amount. The two or three compositions in the silicone alcohol solution mixture are mixed equal-proportionally.

The Seventh Embodiment

The amount of the ingredients in the seventh embodiment is referred to the Table 2. Wherein, the nano-silica hybrid vinyl phenyl silicon intermediate in the seventh embodiment is prepared according to the first embodiment.

A preparation method for the low-viscosity, high-temperature-resistant and corona-resistant environmentally-friendly insulating varnish comprises following steps:

Step I: mixing the nano-silica hybrid vinyl phenyl silicon intermediate and the organic resin and heating them to 120° C., and then depressing and distilling the reacting system for 30 min to remove the few water in the system;

Step II: adding the tetraisopropyl titanate into the system of step I and heating the system to 170° C. to keep the stirring reaction for 3 h, and then cooling the system to 80° C.;

Step III: adding the storage stabilizer, the reactive diluent, the vinyl initiator, the epoxy latent curing agent and the promoter into the system of II successively, thus the low-viscosity, high-temperature-resistant and corona-resistant environmentally-friendly insulating varnish is obtained after mixing them thoroughly. And its main performance is referred to the Table 2.

The Eighth Embodiment

The amount of the ingredients in the eighth embodiment is referred to the Table 2. Wherein, the nano-silica hybrid vinyl phenyl silicon intermediate in the eighth embodiment is prepared according to the third embodiment.

A preparation method for the low-viscosity, high-temperature-resistant and corona-resistant environmentally-friendly insulating varnish comprises following steps:

Step I: mixing the nano-silica hybrid vinyl phenyl silicon intermediate and the organic resin and heating them to 120° C., and then depressing and distilling the reacting system for 30 min to remove the few water in the system;

Step II: adding the tetraisopropyl titanate into the system of step I and heating the system to 160° C. to keep the stirring reaction for 4 h, and then cooling the system to 80° C.;

Step III: adding the storage stabilizer, the reactive diluent, the vinyl initiator, the epoxy latent curing agent and the promoter into the system of II successively, thus the low-viscosity, high-temperature-resistant and corona-resistant environmentally-friendly insulating varnish is obtained after mixing them thoroughly. And its main performance is referred to the Table 2.

The Ninth Embodiment

The amount of the ingredients in the ninth embodiment is referred to the Table 2. Wherein, the nano-silica hybrid vinyl phenyl silicon intermediate in the ninth embodiment is prepared according to the second embodiment.

A preparation method for the low-viscosity, high-temperature-resistant and corona-resistant environmentally-friendly insulating varnish comprises following steps:

Step I: mixing the nano-silica hybrid vinyl phenyl silicon intermediate and the organic resin and heating them to 120° C., and then depressing and distilling the reacting system for 30 min to remove the few water in the system;

Step II: adding the tetraisopropyl titanate into the system of step I and heating the system to 180° C. to keep the stirring reaction for 3 h, and then cooling the system to 80° C.;

Step III: adding the storage stabilizer, the reactive diluent, the vinyl initiator, the epoxy latent curing agent and the promoter into the system of II successively, thus the low-viscosity, high-temperature-resistant and corona-resistant environmentally-friendly insulating varnish is obtained after mixing them thoroughly. And its main performance is referred to the Table 2.

The Tenth Embodiment

The amount of the ingredients in the tenth embodiment is referred to the Table 2. Wherein, the nano-silica hybrid vinyl phenyl silicon intermediate in the tenth embodiment is prepared according to the fourth embodiment.

A preparation method for the low-viscosity, high-temperature-resistant and corona-resistant environmentally-friendly insulating varnish comprises following steps:

Step I: mixing the nano-silica hybrid vinyl phenyl silicon intermediate and the organic resin and heating them to 120° C., and then depressing and distilling the reacting system for 30 min to remove the few water in the system;

Step II: adding the tetraisopropyl titanate into the system of step I and heating the system to 170° C. to keep the stirring reaction for 3 h, and then cooling the system to 80° C.;

Step III: adding the storage stabilizer, the reactive diluent, the vinyl initiator, the epoxy latent curing agent and the promoter into the system of II successively, thus the low-viscosity, high-temperature-resistant and corona-resistant environmentally-friendly insulating varnish is obtained after mixing them thoroughly. And its main performance is referred to the Table 2.

The Eleventh Embodiment

The amount of the ingredients in the eleventh embodiment is referred to the Table 2. Wherein, the nano-silica hybrid vinyl phenyl silicon intermediate in the eleventh embodiment is prepared according to the sixth embodiment.

A preparation method for the low-viscosity, high-temperature-resistant and corona-resistant environmentally-friendly insulating varnish comprises following steps:

Step I: mixing the nano-silica hybrid vinyl phenyl silicon intermediate and the organic resin and heating them to 120° C., and then depressing and distilling the reacting system for 30 min to remove the few water in the system;

Step II: adding the tetraisopropyl titanate into the system of step I and heating the system to 170° C. to keep the stirring reaction for 3 h, and then cooling the system to 80° C.;

Step III: adding the storage stabilizer, the reactive diluent, the vinyl initiator, the epoxy latent curing agent and the promoter into the system of II successively, thus the low-viscosity, high-temperature-resistant and corona-resistant environmentally-friendly insulating varnish is obtained after mixing them thoroughly. And its main performance is referred to the Table 2.

The Twelfth Embodiment

The amount of the ingredients in the twelfth embodiment is referred to the Table 2. Wherein, the nano-silica hybrid vinyl phenyl silicon intermediate in the twelfth embodiment is prepared according to the fifth embodiment.

A preparation method for the low-viscosity, high-temperature-resistant and corona-resistant environmentally-friendly insulating varnish comprises following steps:

Step I: mixing the nano-silica hybrid vinyl phenyl silicon intermediate and the organic resin and heating them to 120° C., and then depressing and distilling the reacting system for 30 min to remove the few water in the system;

Step II: adding the tetraisopropyl titanate into the system of step I and heating the system to 170° C. to keep the stirring reaction for 3 h, and then cooling the system to 80° C.;

Step III: adding the storage stabilizer, the reactive diluent, the vinyl initiator, the epoxy latent curing agent and the promoter into the system of II successively, thus the low-viscosity, high-temperature-resistant and corona-resistant environmentally-friendly insulating varnish is obtained after mixing them thoroughly. And its main performance is referred to the Table 2.

The Fourth Contrastive Example

The amount of the ingredients in the fourth contrastive example is referred to the Table 2. Wherein, the nano-silica hybrid vinyl phenyl silicon intermediate in the fourth contrastive example is prepared according to the first contrastive example.

Step I: mixing the nano-silica hybrid vinyl phenyl silicon intermediate and the organic resin and heating them to 140° C., and then depressing and distilling the reacting system for 30 min to remove the few water in the system;

Step II: adding the tetraisopropyl titanate into the system of step I and heating the system to 190° C. to keep the stirring reaction for 3 h, and then cooling the system to 80° C.;

Step III: adding the storage stabilizer, the reactive diluent, the vinyl initiator, the epoxy latent curing agent and the promoter into the system of II successively, thus the low-viscosity, high-temperature-resistant and corona-resistant environmentally-friendly insulating varnish is obtained after mixing them thoroughly. And its main performance is referred to the Table 2.

The Fifth Contrastive Example

The amount of the ingredients in the fifth contrastive example is referred to the Table 2. Wherein, the nano-silica hybrid vinyl phenyl silicon intermediate in the fifth contrastive example is prepared according to the second contrastive example.

Step I: mixing the nano-silica hybrid vinyl phenyl silicon intermediate and the organic resin and heating them to 100° C., and then depressing and distilling the reacting system for 30 min to remove the few water in the system;

Step II: adding the tetraisopropyl titanate into the system of step I and heating the system to 190° C. to keep the stirring reaction for 3 h, and then cooling the system to 80° C.;

Step III: adding the storage stabilizer, the reactive diluent, the vinyl initiator, the epoxy latent curing agent and the promoter into the system of II successively, thus the low-viscosity, high-temperature-resistant and corona-resistant environmentally-friendly insulating varnish is obtained after mixing them thoroughly. And its main performance is referred to the Table 2.

The Sixth Contrastive Example

The amount of the ingredients in the sixth contrastive example is referred to the Table 2. Wherein, the nano-silica hybrid vinyl phenyl silicon intermediate in the sixth contrastive example is prepared according to the third contrastive example.

Step I: mixing the nano-silica hybrid vinyl phenyl silicon intermediate and the organic resin and heating them to 100° C., and then depressing and distilling the reacting system for 30 min to remove the few water in the system;

Step II: adding the tetraisopropyl titanate into the system of step I and heating the system to 150° C. to keep the stirring reaction for 3 h, and then cooling the system to 80° C.;

Step III: adding the storage stabilizer, the reactive diluent, the vinyl initiator, the epoxy latent curing agent and the promoter into the system of II successively, thus the low-viscosity, high-temperature-resistant and corona-resistant environmentally-friendly insulating varnish is obtained after mixing them thoroughly. And its main performance is referred to the Table 2.

In order to make the people familiar with the field understand and implement the present invention, detailed descriptions which are not limitations to the present invention are given above. The equivalents or modifications made according to the spirit of the present invention should fall into the scope of the present invention.

TABLE 2

| | | Seventh embodiment | Eighth embodiment | Ninth embodiment | Tenth embodiment | Eleventh embodiment | Twelfth embodiment | Third contrastive example | Fourth contrastive example | Fifth contrastive example |
|---|---|---|---|---|---|---|---|---|---|---|
| Preparing recipe for low-viscosity, high-temperature-resistant and corona-resistant environmentally-friendly insulating varnish | | | | | | | | | | |
| Nano-silica hybrid vinyl phenyl silicon intermediate | | 100 | 100 | 100 | 100 | 100 | 100 | 100 | 100 | 100 |
| Organic resin | E51 | 15 | 10 | 20 | 20 | 20 | 20 | 15 | 20 | 20 |
| | F51 | 15 | 15 | | 20 | 25 | 15 | 15 | 20 | 15 |
| | HR199 | | | 10 | | | 10 | | | 10 |
| Tetraisopropyl titanate | | 0.8 | 0.5 | 1.0 | 1.2 | 1.5 | 1.5 | 0.8 | 1.2 | 1.5 |
| Storage stabilizer | HQ | 0.02 | | 0.03 | 0.01 | 0.03 | | 0.02 | | 0.03 |
| | MEHQ | 0.03 | 0.03 | 0.03 | 0.03 | 0.03 | 0.03 | 0.03 | 0.03 | 0.03 |
| | TBHQ | 0.01 | 0.03 | | 0.02 | | 0.03 | 0.01 | 0.03 | |
| Reactive diluent | TPGDA | 5 | 5 | | 10 | 15 | | 10 | 15 | |
| | TMPTA | 5 | | 5 | | | 15 | | | 15 |
| | TGICA | | 5 | 5 | 5 | 5 | 5 | 5 | 5 | 5 |
| Promoter | | 0.15 | 0.15 | 0.15 | 0.15 | 0.15 | 0.15 | 0.15 | 0.15 | 0.15 |
| Vinyl initiator | DCP | 1.5 | | | 1.0 | 1.0 | 1.5 | 1.0 | 1.0 | 1.5 |
| | BPO | | 1.5 | | 0.5 | | | 0.5 | | |
| | CHPO | | | 1.5 | | 0.5 | 0.5 | | 0.5 | 0.5 |
| Epoxy latent | zinc 2-ethylhexanoate | 2.5 | 0.5 | 1 | 3 | | | 2.5 | 0.5 | 1 |
| Curing agent | PI-MA | | 2 | | | 3 | | | 2 | |
| | CDB | | | 2 | | | 3 | | | 2 |
| Main performance of low-viscosity, high-temperature-resistant and corona-resistant environmentally-friendly insulating varnish | | | | | | | | | | |
| viscosity: Pin-4 viscometer, 23 ± 2° C., s | | 35 | 45 | 40 | 45 | 40 | 45 | 80 | 90 | 85 |
| Volatile shares: 155° C., % | | ≤3 | ≤3 | ≤3 | ≤3 | ≤3 | ≤3 | ≤3 | ≤3 | ≤3 |
| Medium loss factor (%) | Normality | ≤1 | ≤1 | ≤1 | ≤1 | ≤1 | ≤1 | ≤1 | ≤1 | ≤1 |
| | 155° C. | ≤3 | ≤3 | ≤3 | ≤3 | ≤3 | ≤3 | ≤8 | ≤8 | ≤8 |
| Temperature indicator ° C. | | 203 | 204 | 206 | 203 | 205 | 209 | 188 | 189 | 192 |
| Corona resistance: (h) | | 32 | 34 | 36 | 31 | 30 | 35 | 15 | 16 | 17 |
| Breakdown strength (MV/m) | Normality | ≥28 | ≥28 | ≥28 | ≥28 | ≥28 | ≥28 | ≥25 | ≥25 | ≥25 |
| | Inundation | ≥23 | ≥23 | ≥23 | ≥23 | ≥23 | ≥23 | ≥23 | ≥23 | ≥23 |
| Storage stability | | 0.32 | 0.35 | 0.45 | 0.35 | 0.40 | 0.38 | 0.78 | 0.82 | 0.75 |

In the Table 2, E51 represents E51 epoxy resin, F51 represents a F51 epoxy resin, HR199 represents an unsaturated polyester resin.

TPGDA represents a tripropylene glycol diacrylate, TMPTA represents a trimethylolpropane triacrylate, and TGICA represents a tri(epoxy propyl) isocyanurate triacrylate.

DCP represents a dicumyl peroxide, BPO represents a dibenzoyl peroxide, and CHPO represents an isopropyl benzene hydroperoxide.

The promoter is a titanium oxide acetylacetonate.

HQ represents a hydroquinone, MEHQ represents a hydroquinone monomethyl ether, and TBHQ represents a 2,5-tert-butyl hydroquinone.

PI-MA represents a methacrylate modified 2-isopropyl imidazole, and CDB represents a catechol dimethyl ethanolamine borate.

The storage stability is measured at 50±1° C. (in water bath at a constant temperature) for 96 h according to a closed-cup method.

We claim:

1. A nano-silica hybrid vinyl phenyl silicone intermediate, wherein, its structural formula is:

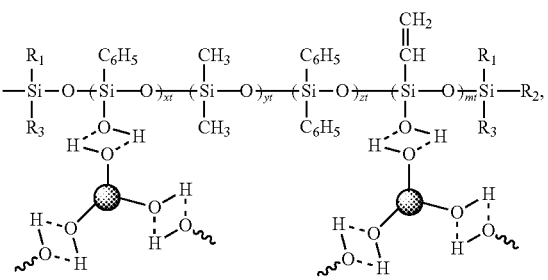

wherein,

represents a nano-silica particle;
"~~~~" represents

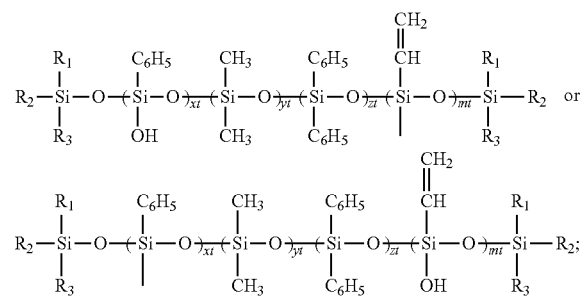

x, y, z, m is respectively a figure between 0 and 20 and none of them equals to 0;
t is a figure between 0.1 and 2.0;
xt represents the product of x and t, yt represents the product of y and t, zt represents the product of z and t, mt represents the product of m and t;
two of R1, R2, R3 are methyl, and the other is vinyl.

2. The nano-silica hybrid vinyl phenyl silicone intermediate of claim 1, wherein, the mass ratio of the nano-silica particle in the nano-silica hybrid vinyl phenyl silicone intermediate is 1%-10%; and the mass ratio of the vinyl in the nano-silica hybrid vinyl phenyl silicone intermediate is 0.6%-4.1%.

3. The nano-silica hybrid vinyl phenyl silicone intermediate of claim 1, wherein, the nano-silica hybrid vinyl phenyl silicone intermediate is prepared from a polymerization reaction of the following recipe, and the recipe by weight comprises:

| | |
|---|---|
| a silicone alcohol solution | 100 shares; |
| an ethyl silicate | 9-25 shares; |
| a catalyst | 0.06-0.6 shares; |
| a molecular weight regulator | 4-6 shares; |
| an Organic solvent | 10-20 shares; and |
| water | 1-6 shares. |

4. The nano-silica hybrid vinyl phenyl silicone intermediate of claim 3, wherein, the organic solvent comprises one or a combination of an N,N-dimethylformamide, a methylbenzene and a dimethylbenzene; the catalyst comprises one or a combination of an aqueous solution of trifluoroacetic acid with a mass percent of 5%-15%, an aqueous solution of trifluoropropionic acid with a mass percent of 5%-15%, and an aqueous solution of hydrochloric acid with a mass percent of 5%-15%; the molecular weight regulator is a tetramethyl diethylene disiloxane.

5. An insulating varnish, wherein, it by weight comprises:

| | |
|---|---|
| a nano-silica hybrid vinyl phenyl silicone intermediate | 100 shares |
| an organic resin | 5-50 shares; |
| a tetraisopropyl titanate | 0.5-1.5 shares; |
| vinyl initiator | 1-5 shares; |
| a promoter | 0.1-2 shares; |
| a storage stabilizer | 0.01-0.1 shares; | wherein, the structural formula of the nano-silica hybrid vinyl phenyl silicone intermediate is:

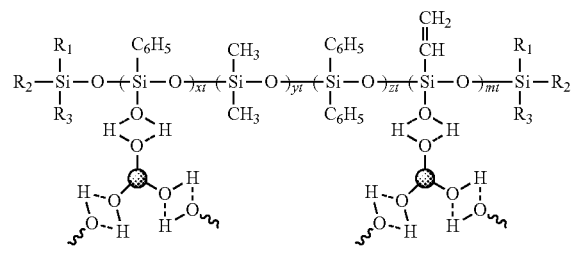

wherein,

represents a nano-silica particle; "~~~~" represents

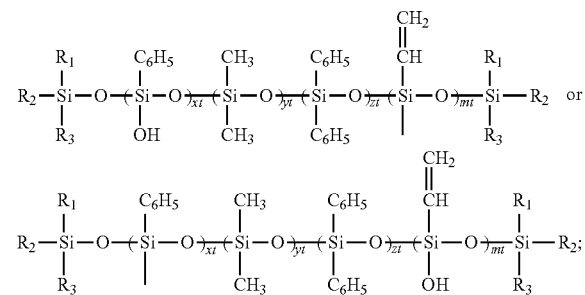

x, y, z, m is respectively a figure between 0 and 20 and none of them equals to 0;
t is a figure between 0.1 and 2.0;
xt represents the product of x and t, yt represents the product of y and t, zt represents the product of z and t, mt represents the product of m and t;
two of R1, R2, R3 are methyl, and the other is vinyl.

6. The insulating varnish of claim 5, wherein, the mass ratio of the nano-silica particle in the nano-silica hybrid vinyl phenyl silicone intermediate is 1%-10%; and mass ratio of the vinyl in the nano-silica hybrid vinyl phenyl silicone intermediate is 0.6%-4.1%.

7. The insulating varnish of claim 5, wherein, the nano-silica hybrid vinyl phenyl silicone intermediate is prepared from a polymerization reaction of the following recipe, and the recipe by weight comprises:

| | |
|---|---|
| a silicone alcohol solution | 100 shares; |
| an ethyl silicate | 9-25 shares; |
| a catalyst | 0.06-0.6 shares; |
| a molecular weight regulator | 4-6 shares; |
| an Organic solvent | 10-20 shares; and |
| water | 1-6 shares. |

8. The insulating varnish of claim 7, wherein, the preparation method for the nano-silica hybrid vinyl phenyl silicone intermediate comprises following steps:

step I: stirring the silicone alcohol solution and the ethyl silicate for 0.1-1 h at 20° C.–35° C. under the protection of nitrogen and in the presence of the organic solvent, and then heating up to 60±5° C.;

step II: adding the catalyst, the molecular weight regulator, and the water into the reacting system of step I and heating up to 60° C.–80° C. to keep the reflux reaction for 2-4 h, and then the nano-silica hybrid vinyl phenyl silicone intermediate is obtained after decompression and distillation.

9. The insulating varnish of claim 7, wherein, the organic solvent comprises one or a combination of an N,N-dimethylformamide, a methylbenzene and a dimethylbenzene; the catalyst comprises one or a combination of an aqueous solution of trifluoroacetic acid with a mass percent of 5%-15%, an aqueous solution of trifluoropropionic acid with a mass percent of 5%-15%, and an aqueous solution of hydrochloric acid with a mass percent of 5%-15%; the molecular weight regulator is a tetramethyl diethylene disiloxane.

10. The insulating varnish of claim 5, wherein, the vinyl initiator comprises one or a mixture of a dicumyl peroxide, a dibenzoyl peroxide, or an isopropyl benzene hydroperoxide; the promoter is a titanium oxide acetylacetonate; the storage stabilizer comprises one or a mixture of a hydroquinone, a hydroquinone monomethyl ether, or a 2,5-tert-butyl hydroquinone.

11. The insulating varnish of claim 5, wherein, the insulating varnish further comprises 5-20 shares of reactive diluent; the reactive diluent comprises one or a mixture of a tripropylene glycol diacrylate (TPGDA), a trimethylolpropane triacrylate (TMPTA), or a tri(epoxy propyl) isocyanurate triacrylate.

12. The insulating varnish of claim 11, wherein, the insulating varnish further comprises 0.01-8 shares of an epoxy latent curing agent; the epoxy latent curing agent comprises one or a mixture of a zinc 2-ethylhexanoate, a methacrylate modified 2-isopropyl imidazole, or a catechol dimethyl ethanolamine borate.

* * * * *